(12) United States Patent
Michels

(10) Patent No.: US 7,770,095 B2
(45) Date of Patent: Aug. 3, 2010

(54) REQUEST PROCESSING BETWEEN FAILURE WINDOWS

(75) Inventor: Peter Michels, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 1036 days.

(21) Appl. No.: 11/497,293

(22) Filed: Aug. 2, 2006

(65) Prior Publication Data

US 2007/0030862 A1 Feb. 8, 2007

Related U.S. Application Data

(60) Provisional application No. 60/704,445, filed on Aug. 2, 2005.

(51) Int. Cl.
*H03M 13/00* (2006.01)
*H04L 1/00* (2006.01)

(52) U.S. Cl. .................................. 714/799; 714/781

(58) Field of Classification Search ............... 370/241, 370/241.1, 248, 252, 253, 516, 527, 528, 370/529, 540, 912, 916, 351; 709/223, 224, 709/230, 231, 232; 714/781, 799, 807
See application file for complete search history.

(56) References Cited

U.S. PATENT DOCUMENTS

| 7,320,101 B1 * | 1/2008 | Bain ........................... 714/781 |
| 2004/0123223 A1 * | 6/2004 | Halford ..................... 714/781 |

* cited by examiner

*Primary Examiner*—Sam Rizk

(57) ABSTRACT

An apparatus and method are provided including a point-to-point cluster link configured to receive a data packet and determines a cyclic redundancy code check for the data packet. The point-to-point cluster link is configured to add a cyclic redundancy code check bit to the data packet transmitted to the point-to-point inter-cluster link, to clear the cyclic redundancy code check bit when the data packet is received, and to sample a cyclic redundancy code window to identify a corrupted data packet.

26 Claims, 2 Drawing Sheets

REQUEST PROCESSING BETWEEN FAILURE WINDOWS

CROSS-REFERENCE TO RELATED APPLICATIONS

This application claims priority of U.S. Provisional Patent Application No. 60/704,445, filed on Aug. 2, 2005. The subject matter of this earlier filed application is hereby incorporated by reference.

BACKGROUND OF THE INVENTION

1. Field of the Invention

The present invention relates to an apparatus and method to prevent propagation of corrupted data packets and, more particularly, to an apparatus and method adding an additional sideband signal to all entries in queues that a data packet transfers through and precluding a corrupted data packet from being transmitted to outside devices when the additional sideband signal is clear.

2. Description of the Related Art

The HyperTransport (HT) technology was developed to provide a high-speed, high-performance point-to-point on-board link for interconnecting integrated circuits on a motherboard. The HT technology can be significantly faster than other bus technologies for an equivalent number of pins. The HT technology is designed to provide significantly more bandwidth than current technologies, to use low-latency responses, to provide low pin count, to be compatible with legacy computer buses, to be extensible to new system architecture buses, to be transparent to operating systems, and to offer little impact on peripheral drivers.

While the HT interface provides a high-speed chip-to-chip interface, data processing performed within the chips itself may often become the bottle neck. In existing serial interfaces, when a packet is sent across the interface, if an error exists in the packet, then there is a protocol built-in into the interface, which would direct that the packet be resent. The HT interface protocol does not implement such a resend feature. A method is needed that would prevent a corrupted packet from going through an integrated circuit and be transmitted to outside devices.

BRIEF DESCRIPTION OF THE DRAWINGS

Further embodiments, details, advantages and modifications of the present invention will become apparent from the following detailed description of the preferred embodiments which is to be taken in conjunction with the accompanying drawings, in which.

DETAILED DESCRIPTION OF THE PREFERRED EMBODIMENTS

An apparatus and method for a chip for network devices is described. In one embodiment, the chip is a specially configured programmable chip such as a programmable logic device or a field programmable gate array. In another embodiment, the chip is an Application Specific Integrated Circuit (ASIC). In yet another embodiment, the chip is a general purpose processor augmented with anability to access and process interconnect packet traffic.

The chip may communicate with their respective I/O devices using link controllers complying with HyperTransport I/O Link Specification, and is able to achieve a throughput of 3.2 GB/sec when using a 1600 MHz data rate. HyperTransport technology is a packet-based link implemented on two independent unidirectional sets of wires. So for example some HyperTransport links may include both an output connection and an input connection. Each HyperTransport link is nominally point-to-point and connects two devices. Chains of HyperTransport links can also be used as an I/O channel, connecting I/O devices and bridges to a host system. The HyperTransport link is designed to deliver a high-performance and scalable interconnect between CPU, memory, and I/O devices. The HyperTransport link uses low swing differential signaling with on-die differential termination to achieve very high data rates. The HyperTransport link uses scalable frequency and data width to achieve scalable bandwidth.

A HyperTransport protocol provides for the orderly and efficient communication of probes and responses on intra-cluster links of a multi-processor cluster, such as point-to-point links. However, the HT protocol does not provide satisfactory error detection or correction capabilities for inter-cluster links.

In order to address this and other issues, the present invention provides a method and apparatus for implementing an error detection capability between failure windows.

Figure 1:
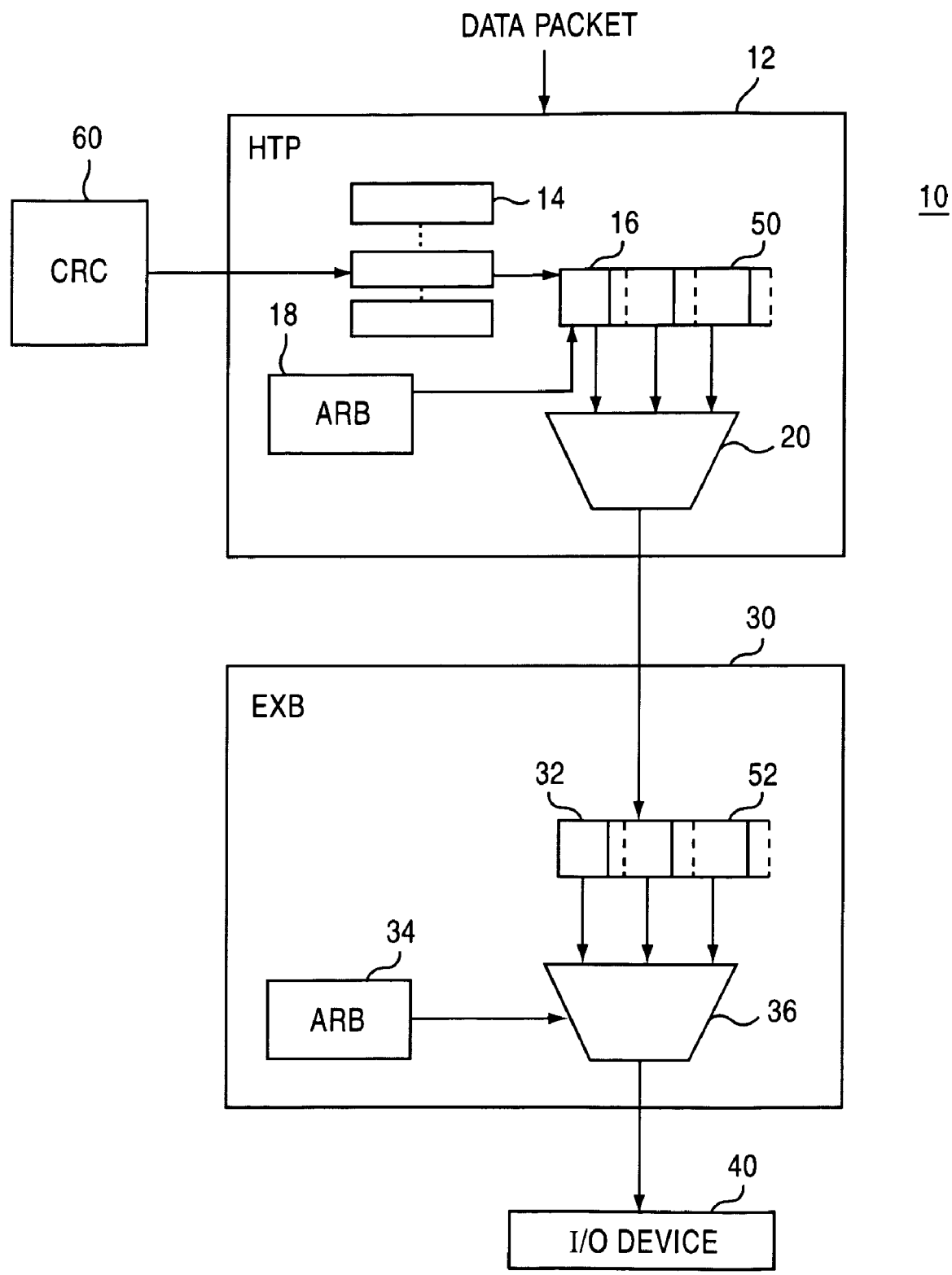
FIG. 1 illustrates a hypertransport link, in accordance with an embodiment of the present invention.

FIG. 1 illustrates the HT link, in accordance with an embodiment of the present invention. The HT link 10 includes a HyperTransport Protocol Interface (HTP) 12 having multiple stage processor pipeline 14 and multiple buffer queues 16. Each packet received can proceed down a particular pipeline(s) 14 to a particular buffer queue(s) 16. An arbitration (ARB) mechanism 18 may be also provided to ensure that the data packets are serviced fairly. The ARB 18 may be operatively connected to the multiple buffer queues 16. A multiplexer 20 may be operatively connected to the buffer queues 16, which would transmit signals from the HTP 12 to an Express Bridge (EXB) 30. In one embodiment, a bus link to transmit the signals between the HTP 12 and the EXB 30 may be a PCI bus or PCI-X bus.

According to the HTP 12, there may be three basic types of signals. The first type is "CAD" (command, address, data) signal, which is a multiplexed signal carrying "control" (request, response, information) signals and data signals. The second type is CNTL signal, which differentiates between control and data signals. The third type of signal is CLK signal. Data packets transmitted (or received) at both edges of CLK signal. For the sake of simplicity, FIG. 1 provides signals traveling in a single direction, but signals normally travel in both directions on the HT link 10.

The control information and data of CAD signal are formed into packets, in multiples of 32 bits. Control packets are 32 bits long or 64 bits long. Data packets range in length from 32 bits to 512 bits. Accordingly, in an exemplary embodiment, the multiple buffers of the HTP may be 512 bits long. Also, the HTP allows a control packet or control bits to be sent within a data packet. For example, a data packet may be 128 bits long but a control packet transmitted after the data packet started and before data packet ended.

Referring back to the EXB 32 in FIG. 1, the EXB also includes multiple buffer queues 32, an arbitration (ARB) mechanism 34, and a multiplexer 36. The multiple buffers in the EXB 32 may be 1 Kbytes in length. Information output from the multiplexer 36 is transmitted to an I/O device 40.

The apparatus and method of the present invention precluding a packet from going to a downstream device if an error between windows occurs. The packet may be precluded from going to the downstream device, for instance, by adding an additional sideband signal maintaining a Cyclic Redundancy Check (CRC) done (crc_done) bit for requests and completions in downstream queues.

A CRC (Cyclic Redundancy Check) code indicates information necessary for detecting bit errors. A CRC 60 is operatively connected to each entry in the buffer queue to perform a CRC check in every buffer queue. According to the HTP 12, the CRC check is performed on the HT link 10 illustrated in FIG. 1.

In accordance with an embodiment of the present invention, 512 beats of data packets are coming in the HTP 12, each beat is 0.5 ns. Thus, there are 256 ns (512 beats*0.5 ns) between CRC windows. The amount of data that is sent is 512 beats times 2 bytes per beat, which is equivalent to 1 Kbytes of buffer required at the EXB 30. In accordance with an embodiment of the present invention, in order to detect failed windows, a sideband signal (i.e., crc_done) is added to all sideband queue entries 50, 52 of each buffer queue that the data packet transfers through. The crc_done bit is initially loaded into each sideband signal queue 50, 52 with a value of "0." The crc_done bit propagates with completions and requests to all destination interfaces in the HT link device 10. When the CRC window is sampled with no errors, all crc_done bits are set to "1." The HTP 12 needs to maintain the crc_done bits to be associated with the corresponding data queues and command queues because the CRC packet can be inserted in the middle of the data packet. At the same time all crc_done bits are set to "1" for each associated data packet, error bits (i.e., crc_error bits) are set. The crc_error bits have the same timing as each corresponding crc_done bit. If no error is detected, the crc_error bit remains deasserted. However, if an error is detected, when the crc_error bit pulses downstream, the sideband signal queues 50, 52 set the crc_error bit to "1" and the crc_done bit to clear or "0." When the data packet is output to the I/O device 40, the crc_error bit and the crc_done bit are set in the data packet header as in the case for other error conditions. Thus, each data packet would identify whether an error occurred during transmission.

In accordance with an embodiment of the present invention, the HTP 12 may perform the entire monitoring of error occurrence. Other interfaces would not need to track the crc_done bit in the data queues. When the HTP 12 propagates the crc_done bit to lower interfaces, such as the EXB 30, the control bit and data crc_done bit and the crc_error bit are "anded" in HTP 12.

Figure 2:
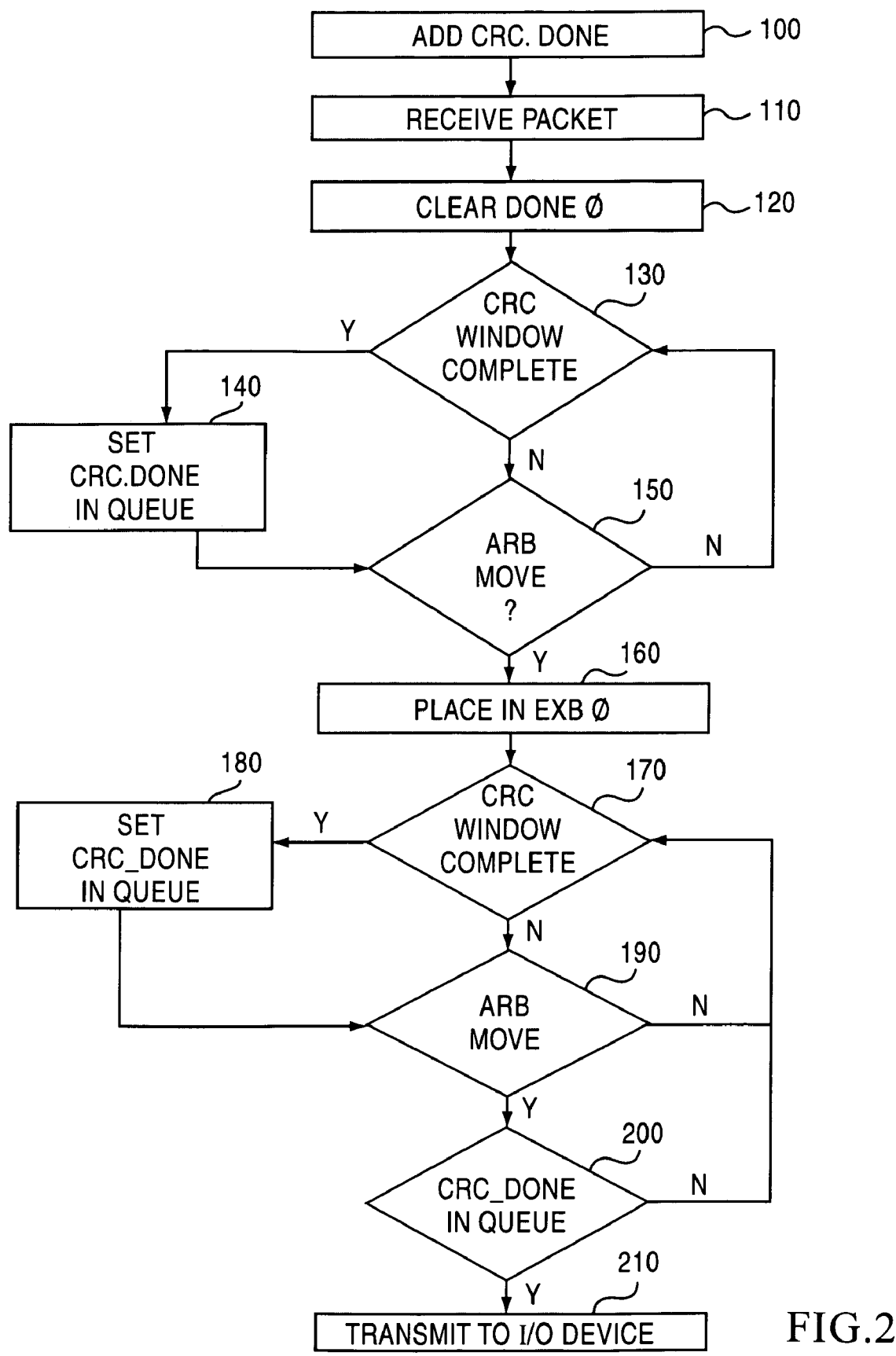
FIG. 2 illustrates a method to detect errors between failure windows, in accordance with an embodiment of the present invention

FIG. 2 illustrates a method to detect errors between failure windows, in accordance with an embodiment of the present invention. At operation 100, the sideband signal (i.e., crc_done) queue is added to all entries of each buffer queue that the data packet transfers through in the HTP 12 and the EXB 30. At operation 110, the data packet is received at the HTP 12. At operation 120, for the data packet received, the crc_done bit is set to an original clear state of "0." At operation 130, a determination is made as to whether the CRC window is complete or, for instance, if the 256 ns window is done, which is performed based on a 512 bit-time window of data, beginning with the data packet transmission after the HT link 10 is initialized. If the CRC window is complete, at operation 140, the crc_done bit is set to done or "1." At the same time all crc_done bits are set to "1" for each associated data packet, the error bits (i.e., crc_error bit) are set. If no error is detected, the crc_error bits remain deasserted.

After operation 140, the method proceeds to operation 150. Also, if at operation 130 the method determines that the CRC window is not complete, the method proceeds to operation 150. At operation 150, the HTP makes an arbitration determination as to whether to leave the data packet and/or the crc_done bit in the queue or to transmit or move to the EXB. The determination may be made, for instance, based on the particular queue and based on PCI standard order rules. At operation 160, if the HTP determines to transmit the data packet and/or the crc_done bit, the EXB 30 receives the data packet and crc_done bit, which is set to "0."

At operation 170, a determination is made as to whether a subsequent CRC window is complete, which is performed based on a 512 bit-time window of data. If the subsequent CRC window is complete, at operation 180, the crc_done bit is set to done or "1." At the same time all crc_done bits are set to "1" for each associated data packet, the error bits (i.e., crc_error bit) are set. If no error is detected, the crc_error bit remains deasserted. After operation 180, the method proceeds to operation 190. Also, if at operation 170, the method determines that the CRC window is not complete, the method proceeds to operation 190. At operation 190, the method makes another arbitration determination in the EXB 30 as to leave the data packet and/or the crc_done bit in the queue or transmit the data packet and/or the crc_done bit to the I/O device 40.

If the EXB 30 determines to transmit the data packet and/or the crc_done bit, the method proceeds to operation 200. Otherwise, the method returns to operation 170. At operation 200, the method determines whether the queue of the crc_done bit is set to "1." If the queue of the crc_done is set to "1," the method proceeds to operation 210 where the data packet is transmitted along with the crc_done bit to the I/O device 40 indicative that the data packet is error free. If multiple downstream devices are provided, then the method would transmit a separate crc_done bit signal and a separate and corresponding crc_error bit signal to each device identifying whether an error occurred in a previous window.

It is to be understood that in the embodiment of the present invention, the operations are performed in the sequence and manner as shown although the order of some operations and the like may be changed without departing from the spirit and scope of the present invention.

Accordingly, in accordance with an embodiment of the present invention there is provided an apparatus and method to add an additional sideband signal (i.e., crc_done) to all entries in queues that a data packet transfers through and to not allow the data packet to exit when the additional sideband signal is clear. The sideband signal is cleared with the data packet is first loaded. The sideband signal propagates with the data packets through the buffer queues during processing. A downstream logic continues to process the packets until the very final stage, prior to outputting the data packets to I/O devices. The final stage does not allow the data packet to exit a chip while the sideband signal is clear, thereby preventing propagation of corrupted packets. The sideband signal is set for all pending fully received packets once a CRC window completes without errors.

In addition, while the terms packet and datagram have been used in the description of the present invention, the invention has import to many types of network data. For purposes of this invention, the term data packet includes packet, cell, frame, datagram, bridge protocol data unit packet, packet data and any equivalents thereof.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed:

1. An apparatus, comprising a point-to-point cluster link configured to-receive and buffer a data packet in a buffer queue that includes a side band signal queue for holding a cyclic redundancy code check bit;
   clear the cyclic redundancy code check bit in the buffer queue when the data packet is received;
   determine a cyclic redundancy code check for the data packet if a cyclic redundancy code check can be determined for the data packet within a cyclic redundancy code check window; and to
   set the cyclic redundancy code check bit in the buffer queue if the cyclic redundancy code check can be determined for the data packet within the cyclic redundancy code check window.

2. The apparatus as recited in claim 1, wherein the point-to-point cluster link is configured to set and clear the cyclic redundancy code check bit in a sideband queue that is added to each buffer queue in the inter-cluster link that the data packet transfers through.

3. The apparatus as recited in claim 2, wherein the point-to-point cluster link is configured to initialize the cyclic redundancy code check bit to low, and if the cyclic redundancy code check can be determined for the data packet within the cyclic redundancy code check window, to set the cyclic redundancy code check bit to high.

4. The apparatus as recited in claim 3, wherein, the point-to-point cluster link is further configured to set a cyclic redundancy code error bit for the data packet at approximately a same time the cyclic redundancy code check bit is set for the data packet if the cyclic redundancy code check can be determined for the data packet within the cyclic redundancy code check window.

5. The apparatus as recited in claim 4, wherein when an error is detected in the data packet during the cyclic redundancy code check window, the point-to-point cluster link is further configured to set the cyclic redundancy code error bit, and to clear the cyclic redundancy code check bit.

6. The apparatus as recited in claim 1, wherein the point-to-point cluster link is configured to determine whether to leave the data packet and the cyclic redundancy code check bit in the buffer queue or to transmit the data packet and the cyclic redundancy code check bit to an express bridge.

7. The apparatus as recited in claim 1, wherein multiple data packets are received and buffered in the buffer queue during the cyclic redundancy code check window and the point-to-point cluster link is configured to clear and set the cyclic redundancy code check bits associated with each of the received data packets in the buffer queue during the cyclic redundancy code check window.

8. The apparatus as recited in claim 1, wherein the point-to-point inter-cluster link comprises a hypertransport link.

9. A hypertransport link, comprising:
   a hypertransport protocol interface comprising a buffer queue that includes a side band signal queue for holding a cyclic redundancy code check bit;
   wherein the hypertransport protocol interface is configured to:
   receive and buffer a data packet in the buffer queue;
   clear the cyclic redundancy code check bit in the buffer queue when the data packet is received;
   determine a cyclic redundancy code check for the data packet if a cyclic redundancy code check can be determined within a cyclic redundancy code check window; and to
   set the cyclic redundancy code check bit in the buffer queue if the cyclic redundancy code check can be determined for the data packet within the cyclic redundancy code check window; and
   an arbitration mechanism that is configured to determine whether to transmit the data packet and the cyclic redundancy code check bit from the buffer queue.

10. The hypertransport link of claim 9, further comprising an express bridge configured to receive the data packet and the cyclic redundancy code check bit from the hypertransport protocol interface if the arbitration mechanism decides to transmit the data packet and the cyclic redundancy code check bit from the buffer queue.

11. The hypertransport link as recited in claim 10, wherein the express bridge is configured to:
   receive the data packet from the hypertransport protocol interface and buffer the data packet in a second buffer queue;
   clear the cyclic redundancy code check bit for the data packet in the second buffer queue;
   determine a second cyclic redundancy code check for the data packet within a second cyclic redundancy code check window; and to
   set the cyclic redundancy code check bit in the second buffer queue when the cyclic redundancy code check is determined for the data packet.

12. The hypertransport link as recited in claim 11, wherein when an error is detected in the data packet during the second cyclic redundancy code check window, the express bridge is further configured to set a cyclic redundancy code error bit and to clear the cyclic redundancy code check bit in the second buffer queue.

13. The hypertransport link as recited in claim 12, wherein the express bridge is configured to determine whether to transmit the data packet and the cyclic redundancy code check bit to an I/O device based on the state of the cyclic redundancy code check bit in the second buffer queue.

14. A computer implemented method, comprising:
   receiving a data packet at a point-to-point inter-cluster link and buffering the data packet in a buffer queue that includes a side band signal queue for holding a cyclic redundancy code check bit; and
   clearing the cyclic redundancy code check bit in the buffer queue when the data packet is received;
   determining a cyclic redundancy code check for the data packet if a cyclic redundancy code check can be determined for the data packet within a cyclic redundancy code check window; and
   setting the cyclic redundancy code check bit in the buffer queue if the cyclic redundancy code check can be determined for the data packet within the cyclic redundancy code check window.

15. The method as recited in claim 14, wherein the cyclic redundancy code check bit is set and cleared in a sideband queue that is added to each buffer queue in the intercluster link that the data packet transfers through.

16. The method as recited in claim 14, further comprising:
initializing the cyclic redundancy code check bit to low; and
setting the cyclic redundancy code check bit to high if the cyclic redundancy code check can be determined for the data packet within the cyclic redundancy code check window.

17. The method as recited in claim 16, further comprising:
setting a cyclic redundancy code error bit for the data packet at approximately a same time the cyclic redundancy code check bit is set for the data packet if the cyclic redundancy code check can be determined for the data packet within the cyclic redundancy code check window.

18. The method as recited in claim 17, further comprising:
determining whether to leave the data packet and the cyclic redundancy code check bit in the buffer queue or to transmit the data packet and the cyclic redundancy code check bit to an express bridge.

19. The method as recited in claim 17, wherein an error is detected in the data packet during the cyclic redundancy code check window, further comprising:
setting the cyclic redundancy code error bit; and
clearing the cyclic redundancy code check bit.

20. The method as recited in claim 14, wherein multiple data packets are received and buffered in the buffer queue during the cyclic redundancy code check window, the method further comprising:
clearing and setting the cyclic redundancy code check bits associated with each of the received data packets in the buffer queue during the cyclic redundancy code check window.

21. A computer implemented method for processing a data packet, comprising:
receiving a data packet;
processing the data packet in a plurality of processing stages, wherein the data packet is buffered in each of the plurality of processing stages in a buffer queue that includes a side band signal queue for holding a cyclic redundancy code check bit;
determining, in at least a final processing stage, a cyclic redundancy code check for the data packet within a cyclic redundancy code check window;
setting the cyclic redundancy code check bit in the side band signal queue of the buffer queue for the final processing stage; and
transmitting the data packet from the final processing stage to an I/O device if the cyclic redundancy code check bit in the side band signal queue of the buffer queue for the final processing stage indicates that the data packet is not corrupted.

22. The computer implemented method of claim 21, further comprising for each processing stage:
clearing the cyclic redundancy code check bit in the sideband signal queue of the buffer queue for the processing stage;
determining a cyclic redundancy code check for the data packet if a cyclic redundancy code check can be determined for the data packet within the cyclic redundancy code check window; and
setting the cyclic redundancy code check bit for the data packet in the sideband signal queue of the buffer queue for the processing stage if a cyclic redundancy code check can be determined for the data packet within the cyclic redundancy code check window.

23. The computer implemented method of claim 22, further comprising setting a cyclic redundancy code error bit and clearing the cyclic redundancy code check bit for the data packet in the sideband signal queue of the buffer queue for the processing stage if a cyclic redundancy code error is detected in the data packet within the cyclic redundancy code check window.

24. The computer implemented method of claim 22, further comprising determining whether to transmit the data packet and the cyclic redundancy code check bit to the next processing stage.

25. The computer implemented method of claim 21, further comprising setting a cyclic redundancy code check bit in a sideband signal queue of a buffer queue for the final processing stage.

26. The method of claim 25, wherein transmitting the data packet from the final processing stage to an I/O device if cyclic redundancy code check indicates that the data packet is not corrupted comprises transmitting the data packet and the cyclic redundancy code check bit to the I/O device.

* * * * *